(12) United States Patent
Zhu

(10) Patent No.: US 9,274,588 B2
(45) Date of Patent: Mar. 1, 2016

(54) METHOD AND APPARATUS FOR REDUCING CHIP POWER CONSUMPTION

(71) Applicant: Huawei Technologies Co., Ltd., Shenzhen, Guangdong (CN)

(72) Inventor: Shilin Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 14/242,584

(22) Filed: Apr. 1, 2014

(65) Prior Publication Data

US 2014/0298057 A1    Oct. 2, 2014

(30) Foreign Application Priority Data

Apr. 1, 2013 (CN) .......................... 2013 1 0112418

(51) Int. Cl.
*G06F 5/06* (2006.01)
*G06F 1/32* (2006.01)

(52) U.S. Cl.
CPC .............. *G06F 1/324* (2013.01); *G06F 1/3253* (2013.01); *Y02B 60/1217* (2013.01)

(58) Field of Classification Search
CPC ....... G06F 1/32; G06F 1/3203; G06F 1/3234; G06F 1/324; G06F 1/3253; G06F 1/3287; Y02B 60/1217
See application file for complete search history.

(56) References Cited

U.S. PATENT DOCUMENTS

| 5,758,133 | A | * | 5/1998 | Evoy | G06F 1/32 713/501 |
| 5,815,693 | A | * | 9/1998 | McDermott | G06F 1/08 713/501 |
| 6,073,244 | A | * | 6/2000 | Iwazaki | G06F 1/08 713/322 |
| 8,819,741 | B2 | * | 8/2014 | Middleton | H04N 7/17318 370/218 |
| 2002/0108070 | A1 | * | 8/2002 | Oh | G06F 1/3203 713/600 |

(Continued)

FOREIGN PATENT DOCUMENTS

| CN | 1466334 A | 1/2004 |
| CN | 101465810 A | 6/2009 |

(Continued)

*Primary Examiner* — Mark Connolly
(74) *Attorney, Agent, or Firm* — Leydig, Voit & Mayer, Ltd.

(57) ABSTRACT

The present invention discloses a method for reducing chip power consumption. The method includes: monitoring real-time load statuses of an input interface, an output interface, and an internal bus of a chip, and collecting load monitoring information; adjusting a working frequency of the chip according to the load monitoring information; and performing rate limiting for an information transmission rate of each channel of the chip according to the current working frequency of the chip. The method and apparatus for reducing chip power consumption according to the present invention solve a problem in the prior art that in a process of chip frequency modulation and power consumption reduction, it is difficult to implement constant rate limiting for a chip channel, thereby providing a feasible solution for reducing chip power consumption while maintaining constant rate limiting for the chip channel.

10 Claims, 2 Drawing Sheets

(56) References Cited

U.S. PATENT DOCUMENTS

| | | | | |
|---|---|---|---|---|
| 2004/0003107 A1* | 1/2004 | Barham | ............. | H04L 12/2602 709/235 |
| 2007/0074060 A1* | 3/2007 | Kuo | ............. | G06F 1/08 713/500 |
| 2008/0162967 A1* | 7/2008 | Wilson | ............. | G06F 1/3203 713/322 |
| 2009/0249090 A1* | 10/2009 | Schmitz | ............. | G06F 1/3203 713/300 |
| 2010/0274933 A1* | 10/2010 | Wang | ............. | G06F 3/0625 710/22 |
| 2010/0293275 A1 | 11/2010 | Rezaiifar et al. | | |
| 2013/0031353 A1* | 1/2013 | Noro | ............. | G06F 1/3212 713/100 |

FOREIGN PATENT DOCUMENTS

| | | |
|---|---|---|
| CN | 101477398 A | 7/2009 |
| CN | 101751111 A | 6/2010 |

* cited by examiner

METHOD AND APPARATUS FOR REDUCING CHIP POWER CONSUMPTION

CROSS-REFERENCE TO RELATED APPLICATION

This application claims priority to Chinese Patent Application No. 201310112418.7, filed on Apr. 1, 2013, which is hereby incorporated by reference in its entirety.

TECHNICAL FIELD

The present invention relates to the field of a chip technology, and in particular, to a method and an apparatus for reducing chip power consumption.

BACKGROUND

Low carbon and environment protection become an international theme today. How to reduce chip power consumption becomes an important topic in chip development. A chip with lower power consumption is more competitive among chips of the same type.

When overall routing load of a chip is not high, power consumption of the entire chip may be reduced by reducing a frequency of the chip. However, that the overall routing load of the chip is not high does not mean that load of every chip channel is not high, and some chip channels may still have a high requirement regarding performance. Therefore, ensuring a bandwidth of each chip channel while reducing power consumption becomes a problem that needs to be solved for a network chip.

In the prior art, chip power consumption is reduced by using a manner of reducing a working frequency of a chip. However, this manner cannot perform rate limiting for a single channel of the chip, which may affect a bandwidth of a single-channel user of the chip. A further improvement is manually adjusting a rate limiting parameter of the single channel of the chip, to ensure the bandwidth of the single-channel user, thereby achieving the purpose of reducing chip power consumption without affecting a user bandwidth of each single channel.

However, this improvement in the prior art still has the following disadvantages:

1. Poor timeliness. An interval between time of adjusting a working frequency of a chip and time of adjusting a rate limiting parameter of a single channel is relatively large, which may result in poor performance of the single channel in a certain period of time and packet loss.

2. A user needs to perform some additional operations, for example, sampling load information of an input/output interface of a chip, and then adjusting a rate limiting parameter of a single channel of the chip according to the load information, which causes an additional cost for the user.

SUMMARY

Embodiments of the present invention provide a method and apparatus for reducing chip power consumption, to solve a problem of performing rate limiting according to a working frequency of a chip, for an information transmission rate of each channel of the chip in a process of adjusting the working frequency of the chip and further reducing the chip power consumption.

According to a first aspect, an embodiment of the present invention provides a method for reducing chip power consumption, including:

monitoring real-time load statuses of an input interface, an output interface, and an internal bus of a chip, and collecting load monitoring information;

adjusting a working frequency of the chip according to the load monitoring information; and performing rate limiting for an information transmission rate of each channel of the chip according to the current working frequency of the chip.

The method according to the embodiment of the present invention can automatically perform rate limiting for the information transmission rate of each channel of the chip according to the working frequency of the chip in the process of adjusting the working frequency of the chip and further reducing the chip power consumption. Therefore, the information transmission rate of each channel of the chip is not affected by a change in the working frequency of the chip.

In a first possible implementation manner of the first aspect, when performing rate limiting for the information transmission rate of each channel of a chip according to the current working frequency of the chip, the method further includes:

performing rate limiting for the information transmission rate of each channel of the chip by using a token bucket manner.

With reference to the first possible implementation manner of the first aspect, in a second possible implementation manner of the first aspect, when performing rate limiting for the information transmission rate of each channel of the chip by using the token bucket manner, the method further includes:

performing rate limiting for the information transmission rate of each channel of the chip by using the following formula:

$$CIR = \frac{\frac{Total}{Div} \times WorkingClockRate}{Divider} \times Token\_size \times 8 \text{ Mbps}, \quad [1]$$

where CIR indicates a committed information rate, that is, the information transmission rate of a single channel among channels of the chip;

$$\frac{Total}{Div}$$

indicates rate limiting parameter information, which is obtained according to the current working frequency of the chip and a maximum working frequency of the chip;

WorkingClockRate indicates the current working frequency of the chip;

Divider is a token filling period of the token bucket; and

Token_size is the number of tokens filled in the token bucket each time.

With reference to the second possible implementation manner of the first aspect, in a third possible implementation manner of the first aspect, when performing rate limiting for the information transmission rate of each channel of the chip by using the token bucket manner, the method further includes:

calculating the rate limiting parameter information by using the following formula:

$$\frac{Total}{Div} = \frac{MaxClockRate}{WorkingClockRate},  \quad [2]$$

where $$\frac{Total}{Div}$$

indicates the rate limiting parameter information;

WorkingClockRate indicates the current working frequency of the chip; and

MaxClockRate indicates the maximum working frequency of the chip.

With reference to the first aspect or any one of the first possible implementation manner to the third possible implementation manner of the first aspect, in a fourth possible implementation manner of the first aspect, when adjusting the working frequency of the chip according to the load monitoring information, the method further includes:

reducing or increasing the working frequency of the chip according to load monitoring information of each monitoring point;

reducing the working frequency of the chip if current load statuses of all the current monitoring points are light load statuses; and increasing the working frequency of the chip if a current load status of any one of the current monitoring points is a heavy load status.

With reference to the fourth possible implementation manner of the first aspect, in a fifth possible implementation manner of the first aspect, when reducing or increasing the working frequency of the chip according to the load monitoring information of each monitoring point, the method further includes:

regarding the load status of the monitoring point as a light load status if the load monitoring information of the monitoring point is less than or equal to a preset minimum threshold; and regarding the load status of the monitoring point as a heavy load status if the load monitoring information of the monitoring point is equal to or greater than the preset minimum threshold.

According to a second aspect, an embodiment of the present invention further provides an apparatus for reducing chip power consumption, including:

a chip load monitoring module, configured to monitor load statuses of an input interface, an output interface, and an internal bus of a chip, and send collected load monitoring information to a chip power management module;

the chip power management module, configured to send an instruction of adjusting a working frequency of the chip to a chip working frequency adjusting module according to the load monitoring information, and send rate limiting parameter information to a chip channel rate limiting module, where the rate limiting parameter information is obtained according to the current working frequency of the chip and a maximum working frequency of the chip;

the chip working frequency adjusting module, configured to adjust the working frequency of the chip according to the instruction of adjusting the working frequency of the chip; and the chip channel rate limiting module, configured to limit an information transmission rate of each channel of the chip according to the rate limiting parameter information.

The apparatus according to the embodiment of the present invention is configured to implement the method according to the present invention. In a process of adjusting a working frequency of a chip and further reducing chip power consumption, the apparatus can automatically perform rate limiting for an information transmission rate of each channel of the chip according to the working frequency of the chip. Therefore, the information transmission rate of each channel of the chip is not affected by a change in the working frequency of the chip.

In a first possible implementation manner of the second aspect, the chip power management module includes a rate limiting parameter information calculating module, configured to calculate the rate limiting parameter information according to the current working frequency of the chip and the maximum working frequency of the chip.

In a second possible implementation manner of the second aspect, the chip channel rate limiting module includes a token bucket calculating module, configured to calculate an information transmission rate of each channel of the chip according to a token bucket manner.

With reference to the second possible implementation manner of the second aspect, in a third possible implementation manner of the second aspect, the chip channel rate limiting module is a packet reassembling module, located on a single channel among channels of the chip.

The embodiments of the present invention solve, by using a method and an apparatus for reducing chip power consumption, a problem of performing rate limiting according to a working frequency of a chip, for an information transmission rate of each channel of the chip in a process of adjusting the working frequency of the chip and further reducing chip power consumption, thereby providing a feasible solution for reducing the chip power consumption while maintaining constant rate limiting for the chip channel. Beneficial effects of the present invention are as follows:

1. The method and apparatus according to the present invention can automatically adjust a working frequency of a chip according to overall load information of an input/output interface of the chip and a bus between internal modules, thereby reducing chip power consumption.

2. In a process of adjusting the working frequency of the chip because of a change in overall load of the chip, a user can ensure that rate limiting for a single chip channel does not change without the need for manually modifying a rate limiting parameter of each chip channel, which ensures that in the process of adjusting the working frequency of the chip, performance for a single-channel user of the chip is not affected. In a dynamic frequency modulation process, a bandwidth of each chip channel does not become higher when the working frequency of the chip increases, and rate limiting performance of each chip channel is not reduced when the working frequency of the chip decreases, that is, constant rate limiting performance is implemented for each channel of the chip in the automatic dynamic frequency modulation process of the chip.

BRIEF DESCRIPTION OF DRAWINGS

To describe the technical solutions in embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Because of a problem in the prior art that rate limiting cannot be automatically performed, according to a working frequency of a chip, for an information transmission rate of each channel of a chip in a process of adjusting the working frequency of the chip and further reducing chip power consumption, embodiments of the present invention propose a method and an apparatus for reducing chip power consumption, thereby providing a feasible solution for reducing chip power consumption while maintaining constant rate limiting.

The following illustrates, with reference to each accompanying drawing, technical solutions of the embodiments of the present invention in terms of a main implementation principle, specific implementation manners, and corresponding beneficial effects that may be achieved.

Figure 1:
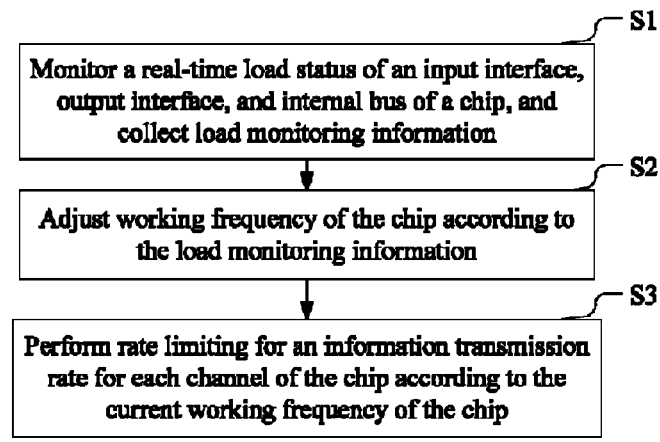
FIG. 1 is a flowchart of a method for reducing chip power consumption according to Embodiment 1 of the present invention.

FIG. 1 is a flowchart of a method for reducing chip power consumption according to an embodiment of the present invention. As shown in FIG. 1, a main implementation principle and process of the embodiment of the present invention is as follows:

Step S1: Monitor real-time load statuses of an input interface, an output interface, and an internal bus of a chip, and collect load monitoring information.

Step S2: Adjust a working frequency of the chip according to the load monitoring information.

Step S3: Perform rate limiting for an information transmission rate of each channel of the chip according to the current working frequency of the chip.

The following uses, according to the foregoing invention principle of the present invention, two embodiments to describe the main implementation principle of the method of the present invention in detail.

Embodiment 1

A method for reducing chip power consumption provided by the embodiment of the present invention includes:

Step S1: Monitor real-time load statuses of an input interface, an output interface, and an internal bus of a chip, and collect load monitoring information.

Step S2: Adjust a working frequency of the chip according to the load monitoring information.

Step S3: Perform rate limiting for an information transmission rate of each channel of the chip according to the current working frequency of the chip.

Furthermore, when performing rate limiting for the information transmission rate of each channel of the chip according to the current working frequency of the chip, the method for reducing chip power consumption according to the embodiment of the present invention further includes:

performing rate limiting for the information transmission rate of each channel of the chip by using a token bucket manner.

The token bucket manner specifically includes:

automatically filling a token in the token bucket according to a preset period;

when sending a packet, if there is a token in the token bucket, sending the packet, and subtracting the number of tokens that need to be consumed for sending the packet; and if there is no token in the token bucket or a token deficit occurs, not sending the packet.

The token bucket manner is used to perform, according to a preset period, rate limiting for a single channel of a chip. If an information transmission rate of a single channel of the chip is high, and the number of tokens that need to be consumed for sending a packet within the period exceeds the number of tokens that is filled within the preset period, that is, the number of tokens in the token bucket, an excessive packet will not be sent because there is no additional token, thereby adjusting the information transmission rate of the single channel of the chip and making the information transmission rate corresponding to the preset period.

Furthermore, when performing rate limiting for the information transmission rate of each channel of the chip by using the token bucket manner, the method for reducing chip power consumption according to the embodiment of the present invention further includes:

performing rate limiting for the information transmission rate of each channel of the chip by using the following formula:

$$CIR = \frac{\frac{Total}{Div} \times WorkingClockRate}{Divider} \times Token\_size \times 8 \text{ Mbps}, \quad [1]$$

where CIR (Committed Information Rate) indicates a committed information rate, that is, the information transmission rate of a single channel among channels of the chip;

$$\frac{Total}{Div}$$

indicates rate limiting parameter information, which is obtained according to the current working frequency of the chip and a maximum working frequency of the chip;

WorkingClockRate indicates the current working frequency of the chip;

Divider is a token filling period of the token bucket; and

Token_size is the number of tokens filled in the token bucket each time.

A rate limiting principle of the foregoing formula [1] is as follows:

To achieve that a rate limiting effect of each channel of the chip is not affected no matter how the working frequency of the chip is adjusted, a rate limiting formula is set as follows:

$$CIR = \frac{MaxClockRate}{Divider} \times Token\_size \times 8 \text{ Mbps}. \quad [3]$$

In formula [3], MaxClockRate is fixed for chip application scenarios, and Token_size and Divider are fixed after a user completes configuration. The user does not need to adjust the configuration in different load cases. Therefore, CIR does not change, that is, an information transmission rate of a single channel among channels of the chip does not change. Only the working frequency of the chip changes. A change of the working frequency of the chip can be supplemented by using the rate limiting parameter $$\frac{Total}{Div},$$

thereby achieving a technical effect that when the chip power is adjusted, a change of the working frequency of the chip will not cause a change of the information transmission rate of a single channel among channels of the chip. No matter how the working frequency of the chip changes, rates of all channels in the chip are constantly limited.

Furthermore, when performing rate limiting for the information transmission rate of each channel of the chip by using the token bucket manner, the method for reducing chip power consumption according to the embodiment of the present invention further includes:

calculating the rate limiting parameter information by using the following formula:

$$\frac{Total}{Div} = \frac{MaxClockRate}{WorkingClockRate}; \quad [2]$$

where $$\frac{Total}{Div}$$

indicates the rate limiting parameter information;

WorkingClockRate indicates the current working frequency of the chip; and

MaxClockRate indicates the maximum working frequency of the chip.

A token is automatically filled in the token bucket according to a preset period, where the preset period is corresponding to the current working frequency of the chip. However, in the foregoing formula [3], the information transmission rate of each channel of the chip is calculated according to the maximum working frequency of the chip. Therefore, a relationship between the working frequency of the chip and the maximum working frequency of the chip needs to be introduced into formula [3]. The relationship between the working frequency of the chip and the maximum working frequency of the chip is:

$$WorkingClockRate = MaxClockRate \times \frac{Div}{Total};$$

The therefore, the following formula is obtained:

$$\frac{Total}{Div} = \frac{MaxClockRate}{WorkingClockRate}; \quad [2]$$

according to formula [2] and formula [3], the rate limiting formula of a single channel of a chip may be correspondingly modified to:

$$CIR = \frac{\frac{Total}{Div} \times WorkingClockRate}{Divider} \times Token\_size \times 8 \text{ Mbps}; \quad [1]$$

that is, formula [1]; the following formula may be obtained by modifying formula [1]:

$$CIR = WorkingClockRate \times \frac{Total \times Token\_size}{Div \times Divider} \times 8 \text{ Mbps}. \quad [4]$$

According to formula [4], a token filling period of the token bucket is expanded from Divider to Divider×Div, and the number of filled tokens changes from the original Token_size to Token_size×Total. Div may be replaced by the current working frequency of the chip, and Total may be replaced by the maximum working frequency of the chip because the rate limiting parameter information $$\frac{Total}{Div}$$

is a quotient of the maximum working frequency of the chip and the current working frequency of the chip. In all the foregoing formulas, a division relationship between Total and Div does not change.

Furthermore, when adjusting working frequency of the chip according to the load monitoring information, the method for reducing chip power consumption according to the embodiment of the present invention further includes:

reducing or increasing the working frequency of the chip according to load monitoring information of each monitoring point;

reducing the working frequency of the chip if current load statuses of all the current monitoring points are light load statuses; and increasing the working frequency of the chip if a current load status of any one of the current monitoring points is a heavy load status.

Reducing the working frequency of the chip when the load statuses of all the monitoring points are the light load statuses does not affect normal operating of the chip and can reduce power consumption of the chip; and when a load status of any one of the current monitoring points is the heavy load status, the working frequency of the chip must be increased so that the chip operates normally. In this way, an information transmission rate of a chip channel where the monitoring point is located is not affected by the heavy load status, and the power consumption of the chip may increase in this case.

Furthermore, when reducing or increasing the working frequency of the chip according to the load monitoring information of each monitoring point, the method for reducing chip power consumption according to the embodiment of the present invention further includes:

regarding the load status of the monitoring point as a light load status if the load monitoring information of the monitoring point is less than or equal to a preset minimum threshold; and regarding the load status of the monitoring point as a heavy load status if the load monitoring information of the monitoring point is equal to or greater than the preset minimum threshold.

The threshold may be set to provide a reference for automatically judging a heavy load status or a light load status of the chip.

Embodiment 2

Figure 2:
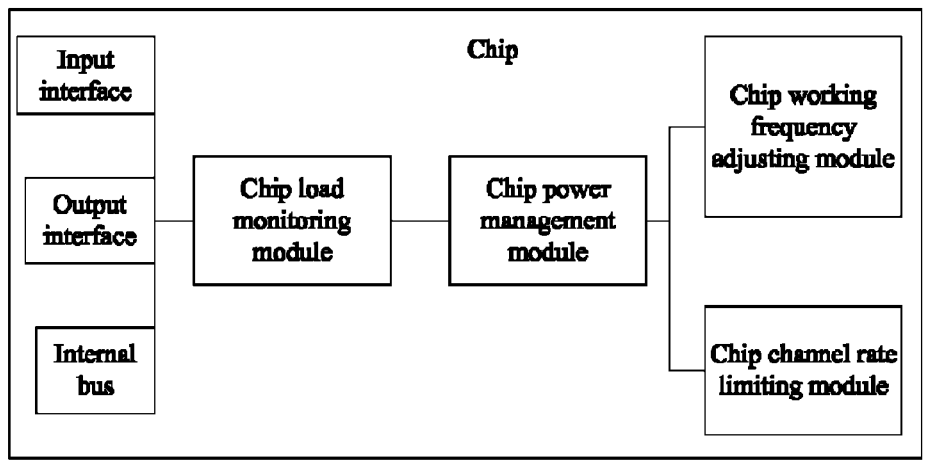
FIG. 2 is a structural diagram of an apparatus for reducing chip power consumption according to Embodiment 2 of the present invention.

FIG. 2 is a structural diagram of an apparatus for reducing chip power consumption according to the embodiment of the present invention. As shown in FIG. 2, the embodiment of the present invention further provides an apparatus for reducing chip power consumption, which includes:

a chip load monitoring module, configured to monitor load statuses of an input interface, an output interface, and an internal bus of a chip, and send collected load monitoring information to a chip power management module, where the collected load monitoring information comes from the real-time load statuses of the chip;

the chip power management module, configured to send an instruction of adjusting a working frequency of the chip to a chip working frequency adjusting module according to the load monitoring information, and send rate limiting parameter information to a chip channel rate limiting module, where the rate limiting parameter information is obtained according to the current working frequency of the chip and a maximum working frequency of the chip; and the rate limiting parameter information is $$\frac{Total}{Div};$$

the chip working frequency adjusting module, configured to adjust the working frequency of the chip according to the instruction of adjusting the working frequency of the chip, where the chip working frequency adjusting module is a phase-locked loop (PLL, Phase Locking Loop);

the instruction of adjusting the working frequency of the chip is used to adjust a level of the working frequency of the chip, and the adjusted working frequency of the chip is N times the maximum working frequency of the chip, where $1/10 \leq N \leq 1$; and the chip channel rate limiting module, configured to limit an information transmission rate of each channel of the chip according to the rate limiting parameter information, where the chip channel rate limiting module is a packet reassembling module (RB, Re-assemble Block), located at a single channel among channels of the chip and controlling rate limiting for a corresponding chip channel.

Furthermore, in the apparatus for reducing chip power consumption according to the embodiment of the present invention, the chip power management module includes a rate limiting parameter information calculating module, configured to calculate the rate limiting parameter information according to the working frequency of the chip and the maximum working frequency of the chip.

Furthermore, the apparatus for reducing chip power consumption according to the embodiment of the present invention, the chip channel rate limiting module includes a token bucket calculating module, configured to calculate an information transmission rate of each channel of a chip according to a token bucket manner.

Figure 3:
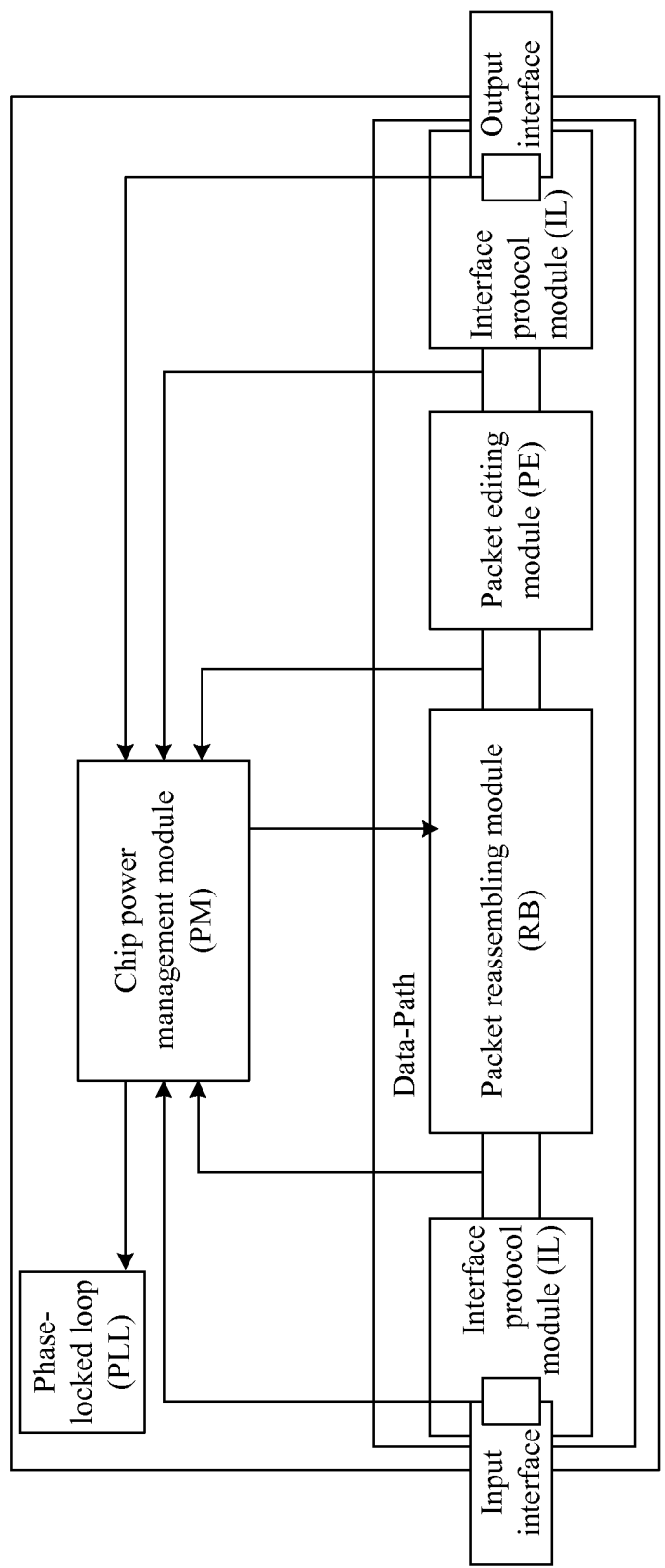
FIG. 3 is a schematic diagram of an apparatus for reducing chip power consumption according to Embodiment 2 of the present invention.

For example, for a certain network chip, FIG. 3 is a schematic diagram of the apparatus for reducing chip power consumption according to Embodiment 2 of the present invention. As shown in FIG. 3, in the network chip, PLL indicates a phase-locked loop, PM indicates a chip power management module, IL (InterLaken) indicates a generic interface protocol module in the industry, PE (Packet Edit) indicates a packet editing module, RB indicates a packet reassembling module, Data-Path is a data path, and a small frame between modules in Data-Path is a bus between the modules. The PM performs monitoring on a bus between the IL and RB, the RB and PE, and the PE and IL. In addition, the PM also performs monitoring on buses of an input interface and an output interface of the chip. In the chip, five monitoring points in total are set. The PM gathers all load monitoring information, then sends an instruction of adjusting a working frequency of the chip to the PLL, and sends rate limiting parameter information to the RB. In addition, the sum of data information traffic of chip channels of which rates are limited and chip channels of which rates are not limited cannot be equal to or greater than total traffic of a bus from the RB to the PE for a long time. Otherwise, the data information traffic of the channels of rates are limited may be affected, which is bad for information transmission in the chip.

A person of ordinary skill in the art may understand that each aspect or the possible implementation manners of each aspect of the present invention may specifically be implemented as a system, a method, or a computer program product. Therefore, each aspect or the possible implementation manners of each aspect of the present invention may adopt a form of a complete hardware embodiment, a complete software embodiment (including firmware, resident software, and so on), or an embodiment combining software and hardware aspects, which are uniformly referred to as a "circuit", "module", or "system" herein. In addition, each aspect or the possible implementation manners of each aspect may adopt a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any appropriate combination of the foregoing, such as a random access memory (RAM), a read-only memory (ROM), an erasable programmable read-only memory (EPROM or flash memory), an optical fiber, and a compact disc read-only memory (CD-ROM).

A computer processor reads the computer-readable program code stored in the computer-readable medium so that the processor may execute a functional action defined in each step or a combination of steps in a flowchart, and generate an apparatus for implementing a functional action defined in each block or a combination of blocks in a block diagram.

The computer-readable program code may be fully executed on a user's computer, partially executed on a user's computer, executed as an independent software package, partially executed on a user's computer and partially on a remote computer, or fully executed on a remote computer or a server. It should also be noted that in some substitute implementation schemes, functions indicated in each step in a flowchart or in each block in a block diagram may not occur in an order indicated in the drawing. For example, depending on an involved function, two steps or two blocks shown in succession may be executed at the same time, or the blocks may sometimes be executed in a reverse order.

Apparently, a person skilled in the art may make modifications or variations on the present invention within the spirit and scope of the present invention. If these modifications and variations fall in the scope of the claims of the present invention or equivalent technologies, the present invention is intended to include these modifications and variations.

What is claimed is:

1. A method for reducing chip power consumption, comprising:
monitoring real-time load statuses of an input interface, an output interface, and an internal bus of a chip, and collecting load monitoring information;

adjusting a working frequency of the chip according to the load monitoring information; and performing rate limiting for an information transmission rate of each channel of the chip according to the current working frequency of the chip.

2. The method for reducing chip power consumption according to claim 1, wherein when performing the rate limiting for the information transmission rate of each channel of the chip according to the current working frequency of the chip, the method further comprises:

performing the rate limiting for the information transmission rate of each channel of the chip using a token bucket manner.

3. The method for reducing chip power consumption according to claim 2, wherein when performing the rate limiting for the information transmission rate of each channel of the chip by using the token bucket manner, the method further comprises:

performing the rate limiting for the information transmission rate of each channel of the chip using the following formula:

$$CIR = \frac{\frac{Total}{Div} \times WorkingClockRate}{Divider} \times Token\_size \times 8 \text{ Mbps}$$

wherein CIR indicates a committed information rate, that is, the information transmission rate of a single channel among channels of the chip;

$$\frac{Total}{Div}$$

indicates rate limiting parameter information, which is obtained according to the current working frequency of the chip and a maximum working frequency of the chip;

WorkingClockRate indicates the current working frequency of the chip;

Divider is a token filling period of the token bucket; and

Token_size is the number of tokens filled in the token bucket each time.

4. The method for reducing chip power consumption according to claim 3, wherein when performing the rate limiting for the information transmission rate of each channel of the chip using the token bucket manner, the method further comprises:

calculating the rate limiting parameter information by using the following formula:

$$\frac{Total}{Div} = \frac{MaxClockRate}{WorkingClockRate}$$

wherein $$\frac{Total}{Div}$$

indicates the rate limiting parameter information;

WorkingClockRate indicates the current working frequency of the chip; and

MaxClockRate indicates the maximum working frequency of the chip.

5. The method for reducing chip power consumption according to claim 1, wherein when adjusting the working frequency of the chip according to the load monitoring information, the method further comprises:

reducing or increasing the working frequency of the chip according to load monitoring information of each monitoring point;

reducing the working frequency of the chip if current load statuses of all the current monitoring points are light load statuses; and increasing the working frequency of the chip if a current load status of any one of the current monitoring points is a heavy load status.

6. The method for reducing chip power consumption according to claim 5, wherein when reducing or increasing the working frequency of the chip according to the load monitoring information of each monitoring point, the method further comprises:

regarding the load status of the monitoring point as a light load status if the load monitoring information of the monitoring point is less than or equal to a preset minimum threshold; and regarding the load status of the monitoring point as the heavy load status if the load monitoring information of the monitoring point is equal to or greater than the preset minimum threshold.

7. An apparatus for reducing chip power consumption, comprising a processor and a non-transitory processor-readable medium having processor-executable instructions stored thereon, the processor-executable instructions including a plurality of modules, the modules including:

a chip load monitoring module, configured to monitor load statuses of an input interface, an output interface, and an internal bus of a chip, and send collected load monitoring information to a chip power management module;

the chip power management module, configured to send an instruction of adjusting a working frequency of the chip to a chip working frequency adjusting module according to the load monitoring information, and send rate limiting parameter information to a chip channel rate limiting module, wherein the rate limiting parameter information is obtained according to a current working frequency of the chip and a maximum working frequency of the chip;

the chip working frequency adjusting module, configured to adjust the working frequency of the chip according to the instruction of adjusting the working frequency of the chip; and the chip channel rate limiting module, configured to limit an information transmission rate of each channel of the chip according to the rate limiting parameter information.

8. The apparatus for reducing chip power consumption according to claim 7, wherein the chip power management module comprises a rate limiting parameter information calculating module, configured to calculate the rate limiting parameter information according to the current working frequency of the chip and the maximum working frequency of the chip.

9. The apparatus for reducing chip power consumption according to claim 7, wherein the chip channel rate limiting module comprises a token bucket calculating module, configured to calculate an information transmission rate of each channel of the chip according to a token bucket manner.

10. The apparatus for reducing chip power consumption according to claim 9, wherein the chip channel rate limiting module is a packet reassembling module, located on a single channel among channels of the chip.

* * * * *